United States Patent [19]

Stapp

[11] Patent Number: 4,470,461

[45] Date of Patent: Sep. 11, 1984

[54] ORGANIC NITRO COMPOUNDS AS COSURFACTANTS IN ENHANCED OIL RECOVERY PROCESSES

[75] Inventor: Paul R. Stapp, Bartlesville, Okla.

[73] Assignee: Phillips Petroleum Company, Bartlesville, Okla.

[21] Appl. No.: 429,737

[22] Filed: Sep. 30, 1982

[51] Int. Cl.$^3$ .............................................. E21B 43/22
[52] U.S. Cl. .............................. 166/273; 252/8.55 D; 252/353; 166/274; 166/275
[58] Field of Search ..................... 252/8.55 D, 8.55 B, 252/DIG. 14, 353; 166/273, 274, 275

[56] References Cited

U.S. PATENT DOCUMENTS

| | | | |
|---|---|---|---|
| 2,356,205 | 8/1944 | Blair et al. | 252/8.55 |
| 3,373,809 | 3/1968 | Cooke | 166/275 |
| 3,508,611 | 4/1970 | Davis et al. | 252/309 X |
| 3,811,505 | 5/1974 | Flournoy et al. | 166/274 |
| 4,013,125 | 3/1977 | Plummer et al. | 166/273 |
| 4,043,922 | 8/1977 | Palmer et al. | 252/8.55 |
| 4,079,785 | 3/1978 | Hessert et al. | 252/8.55 X |
| 4,361,520 | 11/1982 | Luetzelschwab | 260/505 |

*Primary Examiner*—Herbert B. Guynn

[57] ABSTRACT

A surfactant system useful for oil recovery comprising a surfactant, such as a petroleum sulfonate, and a cosurfactant such as a organic nitro compound.

9 Claims, No Drawings

ORGANIC NITRO COMPOUNDS AS COSURFACTANTS IN ENHANCED OIL RECOVERY PROCESSES

This invention relates to surfactant systems. More specifically, this invention relates to the use of new surfactant systems for oil recovery.

Water flooding and surfactant flooding are processes well known in the art to recover vast quantitites of oil which remain in the formation after primary oil recovery. In the case of surfactant flooding, it is not uncommon to employ a cosurfactant wherein the latter aids in forming microemulsion with the oil to be recovered.

The oil recovery effectiveness of surfactant systems can be diminished by the presence of a highly saline environment (i.e., greater than two weight percent total dissolved solids) present in the region of the oil to be recovered. This is because high salinity waters can cause precipitation of surfactants and hence destroy their effectiveness in the oil recovery process. A highly saline environment can also diminish the effectiveness of modility buffers by reducing their viscosity. Therefore, it is highly desirable to develop surfactant systems which are effective in highly saline environments.

It is therefore an object of this invention to provide surfactant systems comprising surfactant and cosurfactant which are effective for tertiary oil recovery even in highly saline environments. A further object of this invention is to provide a surfactant flooding process which enhances tertiary oil recovery.

These and other objects, advantages, details, features and embodiments of this invention will become apparent to those skilled in the art from the following detailed description of the invention and the appended claims.

In accordance with this invention, it has been found that organic nitro compounds can be efficiently used as cosurfactants in surfactant flooding operations for oil recovery.

Thus, in accordance with a first embodiment of this invention, there is provided a new surfactant system comprising a hydrocarbon sulfonate surfactant and an organic nitro compound as a cosurfactant.

Surfactant System

The preferred surfactant system of this invention is an aqueous system, optionally containing a protective agent. Generally, water is used containing a certain quantity of sodium chloride for practical reasons. Typical and preferred compositions of a surfactant system of this invention are shown in the following table:

TABLE I

| Ingredient | Broad Range | Preferred Range |
|---|---|---|
| Water (parts by wt.) | 100 | 100 |
| Hydrocarbon Sulfonate* (active parts by wt.) | 0.1–15 | 1–12 |
| Organic Nitro Compound (parts by wt.) | 0.05–15 | 1–7 |
| Protective Agent (parts by wt.) | 0.01–3 | 0.05–2 |
| NaCl (parts by wt.) | 0–10 | 0.1–8 |

*The ranges for the active hydrocarbon sulfonate (e.g. petroleum sulfonate) in parts by weight. The "active" value is readily determined by multiplying parts by weight used and the fraction of active ingredients in the product.

Surfactant

The surfactant used in the surfactant system of this invention is a hydrocarbon sulfonate. It can be made from relatively pure hydrocarbons or preferably from hydrocarbon mixtures. The preferred surfactant is a petroleum sulfonate. The petroleum sulfonates are commercially available products. The presently preferred surfactants used in oil recovery are petroleum sulfonates having an average equivalent weight in the range of 325 to 600. Best results with presently known reservoirs are believed to be obtainable with petroleum sulfonates having average equivalent weights of about 325 to 500.

COSURFACTANTS

In accordance with this invention organic nitro compounds are used as cosurfactants. These compounds can be represented by the following formula:

$$R-NO_2$$

wherein R is either an alkyl, aryl, hydroxyaryl, alkaryl, aralkyl, cycloalkyl, or alkenyl group with a maximum of 10 carbon atoms.

Representative examples of organic nitro compounds suitable for use in the present invention include nitrobenzene, nitroethane, beta-nitrostyrene, nitromethane, nitrocyclopentane, nitrocyclohexane, 4-nitrotoluene, alpha-nitrotoluene, nitrohexane, nitrodecane, isomeric nitrocresols, isomeric nitrophenols, 3-phenyl-1-nitropropane, 4-cyclopentyl-1-nitrobutane, nitropropane, and mixtures thereof.

Nitrobenzene and nitroethane are the preferred compounds for use in the present invention because of their commercial availability and their demonstrated effectiveness as cosurfactants as shown in the examples.

Whatever organic nitro compound is used, must, however, demonstrate some solubility or miscibility with water. Generally, the compound should have a water solubility of 0.01 to 20, preferably 0.1–10 grams per 100 grams of water.

Oil Recovery Process

An oil recovery process using the surfactant system of this invention as defined above constitutes another embodiment of this invention. This process involves generally the conventional steps of post primary oil recovery and distinguishes over the known procedures primarily in the use of organic nitro compounds defined as cosurfactants.

Preflush

It is optional, although not necessary, to carry out a preflush step preceding the post-primary oil recovery operation. Such preflush operations are known in the art. Generally, a brine compatible with the surfactant system is injected via at least one injection well into the subterranean formation. Such a brine typically contains 2000–50,000 ppm salts, predominantly sodium chloride. Preferably a brine solution as utilized in the production of the surfactant system is also used in this preflush step.

The quantity of the preflush employed will generally be in a range of about 0.01 to 2, preferably 0.25 to 1 pore volume, based on the total pore volume of the formation or reservoir subjected to the recovery.

Surfactant Flooding

After the optional preflush step the surfactant fluid of this invention is injected into the reservoir via at least one injection well. The surfactant system is injected in an amount usually in the range of about 0.001 to 1.0, preferably 0.01 to 0.25 pore volume based on the pore volume of the total treated and produced formation.

The preferred operation makes use of the aqueous saline surfactant system in the form of a single phase. Usually the surfactant system contains water, surfactant and the organic nitro compound cosurfactant as the principal ingredients. The single phase surfactant system is introduced into the formation via one or more injection wells and the generation of a microemulsion takes place in-situ as the injected surfactant system contacts the oil in place. It is contemplated that surfactant systems characterized by the presence of more than one phase are preferably subjected to continuous mixing during the injection operation.

The present invention can be utilized for a variety of subterranean reservoirs. The invention is, however, particularly preferred in reservoirs containing hard brine connate water. Such hard brines are characterized by a high content of $Mg++$ and $Ca++$ ions in the reservoir water. Typical hard brines contain more than 100 ppm of $Ca++$ and/or $Mg++$.

Protective agents are an especially preferred ingredient in the surfactant system of this invention when used for oil recovery from reservoirs with hard brines. They aid in solubilizing the surfactant in a high salinity environment. Examples for such protecting agents are polyethoxylated fatty alcohols and polyethoxylated alkylphenols. In addition, the sodium salts of sulfated polyethoxylated fatty alcohols and polyethoxylated alkylphenols are known in the art to function as protective agents.

Mobility Buffer

Following the surfactant slug it is presently preferred, although again not necessary to inject a mobility buffer solution into the reservoir. This buffer helps prevent fingering and enhances the efficiency of the oil recovery. Buffer solutions are aqueous solutions of thickening agents. Examples of useful mobility buffers are aqueous and nonaqueous fluids containing mobility reducing agents such as high molecular weight partially hydrolyzed polyacrylamides, biopolysaccharides, cellulose ethers and the like. The mobility buffer comprises 50 to 20,000, preferably 200 to 5,000 ppm of the mobility reducing agent in the fluid.

The injection of the mobility buffer fluid can be at a constant composition or the mobility buffer can be graded, i.e., the injection starts out at a relatively high concentration at the leading edge and the concentration tapers off toward the trailing edge. As an example the mobility buffer can start with a concentration of 2500 ppm of polyacrylamide in the water and end with 250 ppm of polyacrylamide in water. These mobility buffer fluids are well known in the art.

The invention will be still more fully understood from the following detailed examples which are intended for illustrative purposes only and not for an undue limitation of the scope of this invention.

EXAMPLE I

The following experimental procedure was used to condition Berea sandstone cores for the surfactant flood runs.

Berea sandstone cores measuring approximately 3 feet in length and 3 inches in diameter were dried under vacuum for 24 hours at 250F. Polycarbonate disc end plates with centrally located 1/8" threaded openings were secured to each end of the core with epoxy adhesive before applying an epoxy coating to the outside surface of the core. The epoxy coating material was formulated by mixing 550 g of a commercially available epoxy resin, 50 g of a suitable activator and 140 g diatomaceous earth. This mixture was stirred until smooth before applying to the surface of the core. The cores were rotated continuously as the epoxy mixture was applied with a 2" paint brush. Four gauze strips measuring 2"×12" were applied to the core in the following manner: a first gauze strip was applied to the core and covered with epoxy as the core was rotated; the remaining three strips were then individually incorporated in a similar manner. The core was cured over a period of about 4 hours at ambient temperature as the core was rotated. One-eighth inch male connector fittings were placed on each end of the core and pipe plug caps were put on the core.

The core was weighed to determine the dry weight before being saturated with brine of the desired concentration. A vacuum of about 1 mm was pulled on the core before saturating the core with approximately 1000 mL of brine. After saturation, approximately 100 to 200 mL of brine were pumped through the core before determining the original permeability to water. A 1 mL portion of effluent brine was collected from the saturated core and thereafter during a period of one minute, the volume of additional effluent collected and the pressure in psi were recorded. With these values the original permeability to water, e.g., on the order of 3.2 mL/min at 43 psi could be recorded. The pore volume of the core was calculated by the relationship:

$$\frac{\text{Brine-Saturated Core Wt (g)} - \text{Dry Core Wt (g)}}{\text{Brine Density (g/mL)}} =$$

Core Pore Volume (mL)

The brine-saturated core was oil flooded in the conventional manner until oil break-through became detectable by the presence of alternate globules of oil and water in the effluent line. The oil flood was carried out to completion by the 24 hour recycling of oil through the core to remove all of the displaceable water. The total water displaced, e.g., water displaced at the point of oil break-through and water displaced by the 24 hour recycle procedure was recorded as water displaced by oil flood. If desired, oil permeability was determined in a manner analogous to that used above for establishing original permeability to water. Prior to waterflood, the effluent line was air blown to remove oil.

The oil-flooded core was waterflooded in the conventional manner until water break-through became detectable by the presence of alternate globules of oil and water in the effluent line. The waterflood was carried to completion by the 24 hour recycling of water through the core to remove all of the displaceable oil. The total oil displaced, e.g., oil displaced at the point of water break-through and oil displaced by the 24 hour recycle procedure was recorded as oil displaced by waterflood. If desired, water permeability after waterflood can be determined in a manner analogous to that used above for original permeability to water. The residual oil volume remaining in the core was calculated by subtracting the oil volume displaced by the waterflood from the water volume displaced by the oilflood. At this point, the core simulated an oil reservoir which had been exhaustively waterflooded. Cores were routinely conditioned in this manner prior to carrying out surfactantflood tests.

EXAMPLE II

This example demonstrates the oil recovery efficiency of an aqueous saline surfactant system containing petroleum sulfonate and nitrobenzene. Waterflood residual oil from a waterwet Berea sandstone core was recovered by surfactantflooding in the conventional manner, i.e., sequential injection of the inventive surfactant system and a thickened aqueous mobility buffer slug of polyacrylamide graded back logarithmically with Arkansas-Burbank water. (Arkansas-Burbank water is relatively fresh water taken from the Arkansas river having an average of 500 ppm of total dissolved solids.

The surfactant slug had the following composition:
- 8.71 g Witco 10-410 (62 wt% active petroleum sulfonate)
- 1.50 g Nitrobenzene
- 3.30 g Sodium Chloride
- 136.49 g Arkansas-Burbank water (A-B water)

Thus, each component was present in the following weight percentages:

| | |
|---|---|
| Petroleum Sulfonates (Active Basis) | 3.6 |
| Nitrobenzene | 1.0 |
| NaCl | 2.2 |
| A-B Water | 91.0 |
| "Inactive" ingredients Witco 10-410 | 2.2 |

The pore volume of the 3"×3' cylindrical Berea sandstone core was 828 mL. A 62.1 mL (7.5% PV) slug of the above surfactant system was injected followed by 414 mL (0.5 PV) of Betz Hi Vis polyacrylamide (ca. 1700 ppm) in Arkansas-Burbank water graded back logarithmically with Arkansas-Burbank water.

In preparing the core, 579 mL of water (i.e., 2.2 wt% NaCl in Arkansas-Burbank water) was displaced from the water-saturated core by oilflood indicating the introduction of approximately 579 mL of oil into the core. Subsequent waterflood resulted in about 296 mL of oil being displaced from the core leaving about 283 mL of waterflood residual oil in the Berea sandstone core prior to the surfactantflood.

In the course of the surfactantflood, a total effluent of 1.77 pore volumes (ca. 1467 mL) was collected which contained 214.6 mL of tertiary oil representing 75.8% of the waterflood residual oil.

EXAMPLE III

This example demonstrates the oil recovery efficiency of an aqueous saline surfactant system containing petroleum sulfonate and nitroethane. Waterflood residual oil from a waterwet Berea sandstone core was recovered by surfactantflooding in the conventional manner, i.e., sequential injection of the inventive surfactant system and a thickened aqueous mobility buffer slug of polyacrylamide graded back logarithmically with Arkansas-Burbank water.

The surfactant slug had the following composition:
- 8.71 g Witco 10-410 (62 wt% active petroleum sulfonate)
- 4.50 g Nitroethane 3.30 g Sodium Chloride
- 133.49 g Arkansas-Burbank water Thus, each component was present in the following weight percentages:

| | |
|---|---|
| Petroleum Sulfonates (Active Basis) | 3.6 |
| Nitroethane | 3.0 |
| NaCl | 2.2 |
| A-B Water | 89.0 |
| "Inactive" ingredients Witco 10-410 | 2.2 |

The pore volume of the 3"×3' cylindrical Berea sandstone core was 838 mL. A 62.9 mL (7.5% PV) slug of the above surfactant system was injected followed by 419 mL (0.5 PV) of Betz Hi Vis polyacrylamide (ca. 1700 ppm) in Arkansas-Burbank water graded back logarithmically with Arkansas-Burbank water.

In preparing the core, 593.2 mL of water (i.e., 2.2 wt% NaCl in Arkansas-Burbank water) was displaced from the water-saturated core by oilflood indicating the introduction of approximately 593.2 mL of oil into the core. Subsequent waterflood resulted in about 283 mL of oil being displaced from the core leaving about 310.2 mL of waterflood residual oil in the Berea sandstone core prior to the surfactantflood.

In the course of the surfactantflood, a total effluent of 1.73 pore volumes (ca. 1446 mL) was collected which contained 238.6 mL of tertiary oil representing 76.9% of the waterflood residual oil.

Reasonable variations and modifications which will become apparent to those skilled in the art can be made in this invention without departing from the spirit and scope thereof.

I claim:

1. A surfactant composition comprising:
   (a) a hydrocarbon sulfonate surfactant;
   (b) an organic nitro cosurfactant of the formula $$R-NO_2$$

wherein R is either an alkyl, aryl, hydroxyaryl, alkaryl, aralkyl, cycloalkyl, or alkenyl group with a maximum of 10 carbon atoms and wherein said surfactant is present in an amount from 0.1-15 parts by weight and said cosurfactant is present in an amount from 0.05-15 parts by weight; and (c) water in an amount of 100 parts by weight.

2. A surfactant according to claim 1 further comprising from 0.01-3 parts by weight of a polyethoxylated fatty alcohol or polyethoxylated alkylphenol protective agent.

3. A surfactant according to claim 2 wherein NaCl is present in an amount up to 10 parts by weight.

4. A surfactant according to claim 3 wherein said cosurfactant is either nitrobenzene or nitroethane.

5. A process for hydrocarbon recovery from a subterranean formation comprising:
   (a) injecting a surfactant system comprising a hydrocarbon sulfonate surfactant and an organo nitro cosurfactant, represented by the general formula:

$$R-NO_2$$

wherein R is either an alkyl, aryl, hydroxyaryl, alkaryl, aralkyl, cycloalkyl, or alkenyl group with a maximum of 10 carbon atoms wherein said surfactant if present in an amount of from about 0.1 to about 15 parts by weight and said cosurfactant is present in an amount from about 0.05-15 parts by weight, into said formation via at least one injection well thereby causing the so injected surfactant system to move from the injection well thereby displacing the hydrocarbon present in said subterranean formation, and (b) thereafter recovering the displaced hydrocarbon from said subterranean formation.

6. A process in accordance with claim 5 wherein a mobility buffer is injected into said subterranean formation following the surfactant system.

7. A process in accordance with claim 6 wherein an aqueous drive fluid is injected into said subterranean formation following said mobility buffer fluid.

8. A process in accordance with claim 7 wherein said surfactant system further comprises a polyethoxylated fatty alcohol or polyethoxylated alkylphenol protective agent and is injected into a subterranean formation containing hard brine.

9. A process in accordance with claim 8 wherein said surfactant system comprises a petroleum sulfonate and nitrobenzene.

* * * * *